Jan. 7, 1941.    J. B. VICTOR ET AL    2,227,771
OIL SEAL WITH VARIABLE SHELL
Filed Oct. 21, 1939

JOSEPH B. VICTOR
WILBURN F. BERNSTEIN
INVENTORS
PER
Albert J. Fihe
ATTORNEY

Patented Jan. 7, 1941

2,227,771

UNITED STATES PATENT OFFICE 2,227,771

OIL SEAL WITH VARIABLE SHELL

Joseph B. Victor, Oak Park, and Wilburn F. Bernstein, Brookfield, Ill., assignors to Victor Manufacturing and Gasket Company, Chicago, Ill., a corporation of Illinois Application October 21, 1939, Serial No. 300,612

3 Claims. (Cl. 288—3)

This invention relates to an improved oil seal with variable shell and has, for one of its principal objects, the provision of sealing elements for rotatable shafts which will facilitate the reduction of production equipment costs and will also make a simpler seal for general handling.

One of the important objects of this invention is to provide, in a fluid seal of the class described, a resilient or flexible diaphragm or packing element which shall be so constructed that it will be amenable to ready insertion into and use with any one of a number of containing shells of different outside diameters whereby it may be readily incorporated into different types of apparatus wherever the same diameter of rotating shaft is used.

Another important object of the invention is the provision, in a fluid seal, of a resilient diaphragm or packing element which is internally and integrally reinforced whereby a more satisfactory structure results and one which is not at all liable to distortion or damage even under the most trying conditions of service or even in the hands of relatively unskilled mechanics during the installation process.

Another and still further important object of the invention is to provide, in an oil seal, means for protecting the actual operating face of the diaphragm or sealing element from undue wear while, at the same time, maintaining an efficient fluid sealing contact with the rotating shaft.

Other and further important objects of the invention will be apparent from the disclosures in the accompanying drawing and following specification.

The invention, in a preferred form, is shown in the drawing and hereinafter more fully described.

Figure 1:
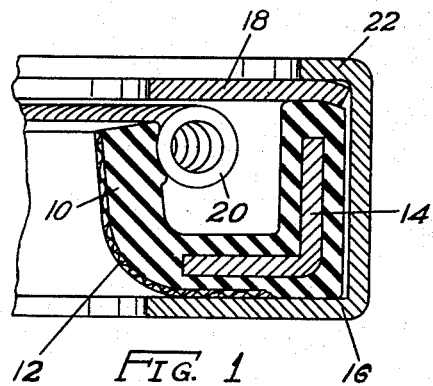
Figure 1 is a sectional view of an improved oil seal constructed in accordance with this invention showing one of the simpler types of variable containing shells.

The reference numeral 10 indicates generally the improved diaphragm or flexible sealing element of the novel fluid seal of this invention. This diaphragm is preferably composed of some moldable material as, for example, a synthetic rubber which readily lends itself to such molding, vulcanizing and forming, and which, at the same time, is resistant to the action of oils and other fluids commonly encountered in seals operating on rotating shafts.

The sealing element itself has its outer shaft contacting face covered with a friction reducing material 12 preferably of some selected fabric which is incorporated into the material of the diaphragm usually during the molding operation.

The diaphragm is essentially U-shaped as shown, one leg of the U being flexible so as to make a thorough fluid-sealing contact with the rotating shaft and the lower portion, and the other leg of the U being reinforced by an annular pressing shell or the like L-shaped in cross section as best shown at 14. This produces an annular sealing element of synthetic rubber with an interior friction reducing and wear resisting face and with an interior reinforcing shell incorporated thereinto during the molding or vulcanizing operation whereby a certain desired rigidity or strength is actually built into the diaphragm at all parts thereof except that portion which need be flexible and which accordingly contacts the rotating shaft.

In its simplest embodiment, the fluid seal comprises the diaphragm as above described, the same being inserted into a cup-shaped outer retaining shell 16 as best shown in Figure 1 with a substantially flat washer 18 positioned on the top of the diaphragm so as to cover practically the entire U-shaped portion thereof forming a closed seal and also comprising an inclosure for a garter spring or the like 20 which acts against the sealing lip of the diaphragm to maintain a still more efficient contact with the rotatable shaft.

The upper edge 22 of the outer cup-shaped shell 16 is turned downwardly or spun inwardly as shown so as to provide a unitary structure with a tight sealing fit between the bottom of the diaphragm 10 against the bottom of the shell 16 and another tight sealing fit or contact between the upper edge of the outer leg of the diaphragm and the corresponding lower face of the outer edge of the washer 18. In this way, leakage between the shell and the diaphram is prevented, and, of course, the contact between the flexible lip of the diaphragm and the face of the rotating shaft guards against leakage at this point.

The inner reinforcing L-shaped annular cup 14 is of such dimensions that sufficient flexibility is allowed for the lip of the diaphragm while, at the same time, suitable strength is afforded for the rear portion, and a proper sealing contact results between the base of the diaphragm and the inner face of the bottom of the shell 16 on the one hand and the upper edge of the outer leg or rim of the diaphragm and the washer 18 on the other hand.

Figure 2:
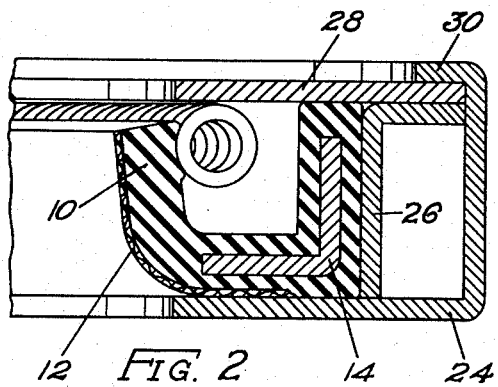
Figure 2 shows the same diaphragm or sealing element inclosed in a shell of larger outside diameter.

The same construction of diaphragm is shown in Figure 2, but here a containing shell 24 of larger diameter is provided, the base of the diaphragm being seated against the inner face of this shell similar to the construction in Figure 1, but on account of the excess diameter of this shell 24, a reinforcing element in the form of an annular cup-shaped shell of L-shaped cross section is placed behind the diaphragm as illustrated in order to properly centrally position the same in the shell and, at the same time, act as a packing or reinforcement therefor.

A sealing washer 28 is provided acting against both the upper face of the outer rim of the diaphragm and the corresponding upper face of the L-shaped annular reinforcing member 26. The upper edge 30 of the outer containing shell 24 is spun or turned down in the usual manner to provide an integral sealing structure.

Figure 3:
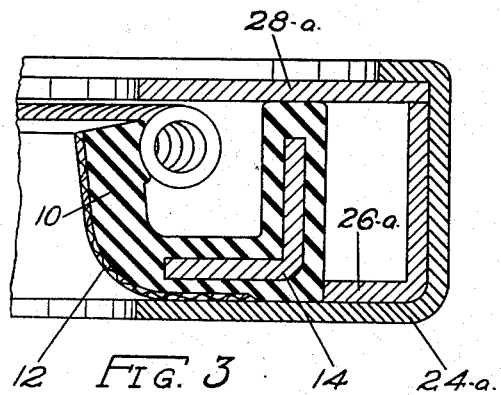
Figure 3 illustrates a slightly modified form of the construction shown in Figure 2.

In Figure 3, the parts are substantially the same, the outer shell 24a having a diaphragm positioned therein in substantially the same manner as in Figure 2, but the position of the reinforcing and packing shell 26a is reversed, the lower leg thereof acting simply against the corresponding lower outer edge of the diaphragm or sealing element whereby proper positioning results. The washer 28a acts in a manner similar to that described in connection with Figure 2, and a proper fluid-tight seal results.

Figure 4:
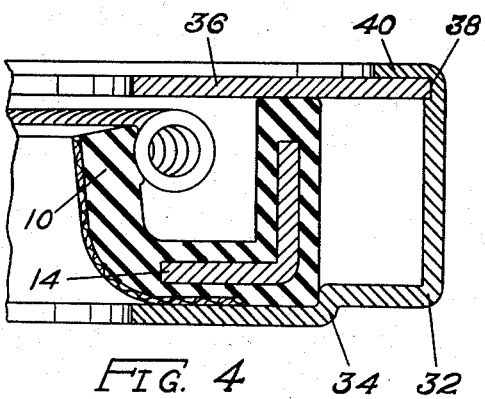
Figure 4 shows another modification still using the same diaphragm or sealing element but with a variation in the means of retaining the same in the shell.

In Figure 4, the diaphragm 10 with its reinforcement 14 is positioned in an outer shell or housing 32 which has an annular offset or ridge 34 formed therein of a diameter corresponding to the external diameter of the sealing element 10. This forms a positioning seat for the diaphragm and also acts as a seal against leakage of fluid there-around. A positioning washer 36 is provided, this being fastened in a countersunk portion 38 formed in the upper edge of the shell 32, the extreme upper edge 40 of the shell being then bent or spun down as shown to produce a complete unitary structure.

Figure 5:
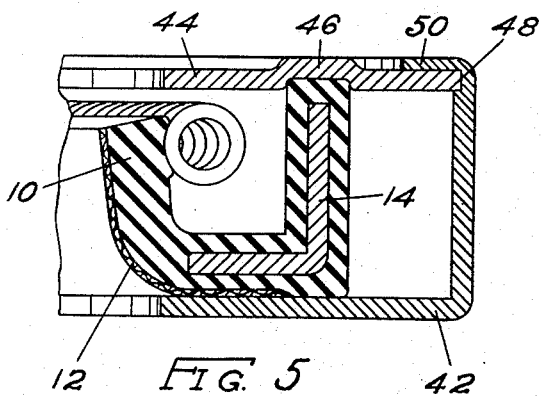
Figure 5 illustrates a still further modification, it being understood that the diameters of the outside retaining shells for the diaphragm may be varied considerably in any of the modifications without affecting the structure in any way.

In Figure 5, a somewhat similar design is illustrated, this comprising a containing shell or housing 42 with a flat bottom as shown and a cooperating washer 44 formed with an annular outside hump or internal groove as indicated at 46 and in which the upper outer edge of the diaphragm is seated. The outer edge of this washer is positioned in a countersunk groove 48 in the upper inner edge of the shell 42 and the extreme upper edge 50 of this shell is turned down as illustrated to join the parts into a tight fitting relationship.

It will be evident that herein is provided a fluid seal structure which comprises a very simply manufactured diaphragm of a standard size which can be used on any shaft of that size regardless of the inside diameter of the opening in the housing in which the particular shaft is positioned. In other words, a single size of diaphragm may be used in a great number of different structures regardless of the special design of the structure or the size of the particular opening associated with the shaft simply by varying the outside diameter of the shell in which the diaphragm is placed. Furthermore, the diaphragm itself is so constructed that it is practically proof against undesirable distortion in almost any association, and the simple act of inserting the same in a properly designed containing shell will assure of a fluid-tight joint between the diaphragm and associated portions of the shell, and its sealing relationship with a rotating shaft has been proven by experience to be most satisfactory.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. A fluid seal, comprising a molded annular diaphragm U-shaped in cross section, an annular reinforcing member built into one leg of the U, a containing housing for the diaphragm, said housing comprising an annular cup-shaped shell of larger diameter than the outside diameter of the diaphragm, a reinforcing and packing element in the shell between its inner face and the outer face of the diaphragm, a retaining washer positioned in the upper end of the shell and acting against the upper outer edge of the diaphragm and also acting against the reinforcing and packing element, the reinforcing and packing element comprising an annular shell L-shaped in cross section.

2. A fluid seal, comprising a molded annular diaphragm U-shaped in cross section, an annular reinforcing member built into one leg of the U, a containing housing for the diaphragm, said housing comprising an annular cup-shaped shell of larger diameter than the outside diameter of the diaphragm, a reinforcing and packing element in the shell between its inner face and the outer face of the diaphragm, a retaining washer positioned in the upper end of the shell and acting against the upper outer edge of the diaphragm and also acting against the reinforcing and packing element, the reinforcing and packing element comprising an annular shell L-shaped in cross section with its base positioned against the inner face of the washer.

3. A fluid seal, comprising a molded annular diaphragm U-shaped in cross section, an annular reinforcing member built into one leg of the U and a containing housing for the diaphragm, said housing comprising an annular cup-shaped shell of larger diameter than the outside diameter of the diaphragm, and a reinforcing and packing element in the shell between its inner face and the outer face of the diaphragm, together with a retaining washer positioned in the upper end of the shell and acting against the upper outer edge of the diaphragm and also acting against the reinforcing and packing element, the reinforcing and packing element comprising an annular shell L-shaped in cross section with its base positioned against the bottom of the cup-shaped shell.

JOSEPH B. VICTOR.
WILBURN F. BERNSTEIN.